(12) United States Patent
Nakao

(10) Patent No.: US 11,718,383 B2
(45) Date of Patent: Aug. 8, 2023

(54) JOINT STRUCTURE FOR BATHROOM DOOR BODY OF AIRPLANE BATHROOM UNIT

(71) Applicant: The Yokohama Rubber Co., LTD., Tokyo (JP)

(72) Inventor: Kazushi Nakao, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 171 days.

(21) Appl. No.: 17/286,964

(22) PCT Filed: Oct. 9, 2019

(86) PCT No.: PCT/JP2019/039768
§ 371 (c)(1),
(2) Date: Apr. 20, 2021

(87) PCT Pub. No.: WO2020/095605
PCT Pub. Date: May 14, 2020

(65) Prior Publication Data
US 2021/0387714 A1    Dec. 16, 2021

(30) Foreign Application Priority Data
Nov. 5, 2018   (JP) ................. 2018-207892

(51) Int. Cl.
*E05D 5/02* (2006.01)
*B64C 1/14* (2006.01)
(Continued)

(52) U.S. Cl.
CPC .............. *B64C 1/1461* (2013.01); *E05D 3/02* (2013.01); *E05D 5/043* (2013.01); *E05D 5/062* (2013.01);
(Continued)

(58) Field of Classification Search
CPC ......... E05D 11/0054; E05D 2011/0063; E05D 2011/0072; E05D 3/122; E05D 1/00;
(Continued)

(56) References Cited

U.S. PATENT DOCUMENTS 1,639,634 A * 8/1927 Raymond ............... E05D 11/04
16/274
2,307,560 A   5/1939 Apel
(Continued)

FOREIGN PATENT DOCUMENTS

DE       525615 C  * 5/1931
GB    2496125 A  * 5/2013 ......... E05D 11/0054
(Continued)

*Primary Examiner* — Chuck Y Mah
(74) *Attorney, Agent, or Firm* — Thorpe North & Western

(57) ABSTRACT

A joining structure of a door panel for a lavatory of an aircraft lavatory unit is provided. A plurality of pairs of end surfaces of a structural frame side hinge portion end surface and a door panel side hinge portion end surface facing each other in the vertical direction are alternately provided at intervals in the vertical direction. Bearing members each formed in a cylindrical shape and including a shaft insertion hole are disposed between at least two pairs of end surfaces adjacent to each other in the vertical direction, of the plurality of pairs of end surfaces. Both surfaces of the bearing member are in contact with each of the two pairs of end surfaces.

10 Claims, 5 Drawing Sheets

(51) Int. Cl.
*E05D 3/02* (2006.01)
*E05D 5/04* (2006.01)
*E05D 5/06* (2006.01)
*E05D 5/14* (2006.01)
*E05D 7/00* (2006.01)

(52) U.S. Cl.
CPC ............... *E05D 5/14* (2013.01); *E05D 7/009* (2013.01); *E05Y 2900/502* (2013.01); *E05Y 2900/531* (2013.01)

(58) Field of Classification Search
CPC ........... E05D 5/06; E05D 5/043; E05D 5/062; E05D 5/14; E05D 7/009; E05D 3/02; E05C 17/54; E05Y 2900/132; E05Y 2900/502; E05Y 2900/531; E05Y 2600/46; E05Y 2600/41; E05Y 2201/484; E05Y 2201/496; E05Y 2201/10; E05Y 2201/11; Y10T 16/533; Y10T 16/5335; Y10T 16/537; Y10T 16/541; Y10T 16/542; Y10T 16/5388; E05F 1/1215; B64C 1/1461
See application file for complete search history.

(56) References Cited

U.S. PATENT DOCUMENTS

| | | | | |
|---|---|---|---|---|
| 3,881,220 A | | 5/1975 | Kiraly | |
| 5,778,491 A | * | 7/1998 | Baer | E05D 3/122 16/234 |
| 6,434,888 B1 | * | 8/2002 | Shaw | E06B 7/367 16/258 |
| 6,449,802 B2 | * | 9/2002 | Maeda | E06B 7/362 16/389 |
| 8,627,610 B1 | * | 1/2014 | Crowther | E04H 1/1266 52/211 |
| 8,752,245 B2 | * | 6/2014 | Duffy | E05D 3/02 16/250 |
| 8,863,358 B2 | * | 10/2014 | Ochs | E05D 7/0009 16/246 |
| 9,181,749 B1 | * | 11/2015 | Davis | E06B 7/36 |
| 10,125,527 B2 | * | 11/2018 | Smalls | E05D 7/009 |
| 2006/0107489 A1 | * | 5/2006 | Yamaguchi | E05D 5/10 16/234 |
| 2007/0261201 A1 | * | 11/2007 | Baer | E05D 3/122 16/236 |
| 2013/0117966 A1 | * | 5/2013 | Branning | E05D 11/00 16/273 |
| 2016/0215544 A1 | | 7/2016 | Smalls | |
| 2018/0328089 A1 | * | 11/2018 | Hall | E05D 11/1014 |
| 2019/0292822 A1 | * | 9/2019 | Kenerly | E05D 5/16 |

FOREIGN PATENT DOCUMENTS

| | | |
|---|---|---|
| JP | 11-303515 A | 11/1999 |
| JP | 2006-274590 A | 10/2006 |
| JP | 2007-23726 A | 2/2007 |
| JP | 3139080 U | 1/2008 |
| JP | 2008-75347 A | 4/2008 |
| JP | 2013-224525 A | 10/2013 |
| JP | 2015-224734 A | 12/2015 |
| WO | WO 2006/008144 A1 | 1/2006 |

* cited by examiner

US 11,718,383 B2

JOINT STRUCTURE FOR BATHROOM DOOR BODY OF AIRPLANE BATHROOM UNIT

TECHNICAL FIELD

The present technology relates to a joining structure for a door panel of a lavatory for an aircraft lavatory unit.

BACKGROUND ART

In the related art, a long hinge is used on a door panel that opens and closes an entrance into an aircraft lavatory unit.

The long hinge includes a pair of attachment plate portions, cylindrical hinge portions provided on one side of the attachment plate portions, and a support shaft inserted in support shaft insertion holes of the hinge portions.

In the door panel that opens and closes the entrance into the aircraft lavatory unit, out of the pair of the attachment plate portions, one attachment plate portion of the long hinge is attached by a screw or the like to a lavatory structural frame and the other attachment plate portion is attached by a screw or the like to the door panel with the longitudinal direction of the long hinge being vertical. The hinge portions of the attachment plate portions are alternately arranged in a vertical direction, and the support shaft is inserted into the support shaft insertion holes of the hinge portions. Thus, the door panel is pivotally joined to the lavatory structural frame.

In addition, from the perspective of design, workability, and weight reduction, aluminum alloys are often used as materials constituting the long hinge.

However, the hinge portions wear out due to the empty weight of the door panel after long-term use, and a large gap can be generated between the hinge portions. Consequently, the door panel may rattle, and deterioration in the design may occur.

SUMMARY

The present technology provides a joining structure for a door panel of a lavatory for an aircraft lavatory unit, which is advantageous in preventing rattling of the door panel and deterioration in the design.

A joining structure for a door panel of a lavatory for an aircraft lavatory unit is provided, the joining structure including a long hinge that includes a structural frame side hinge member and a door panel side hinge member, the structural frame side hinge member being slender in a vertical direction and attached to a section configuring an entrance of a structural frame forming the lavatory of the aircraft lavatory unit, and the door panel side hinge member being slender in a vertical direction and attached to the door panel configured to open and close the entrance, the structural frame side hinge member including a structural frame side attachment plate portion and a plurality of structural frame side hinge portions, the a structural frame side attachment plate portion being attached to the section that configures the entrance of the structural frame, and the plurality of structural frame side hinge portions being disposed projecting at intervals in the vertical direction on the structural frame side attachment plate portion, the door panel side hinge member including a door panel side attachment plate portion and a plurality of door panel side hinge portions, the door panel side attachment plate portion being attached to the door panel, and the plurality of door panel side hinge portions being disposed projecting at intervals in the vertical direction on the door panel side attachment plate portion, and being alternately arranged with the plurality of structural frame side hinge portions in the vertical direction, the plurality of structural frame side hinge portions and the plurality of door panel side hinge portions being alternately arranged in the vertical direction and providing a plurality of pairs of an end surface of the structural frame side hinge portion and an end surface of the door panel side hinge portion, the door panel being pivotally joined to the structural frame by a support shaft being inserted into support shaft insertion holes of the plurality of structural frame side hinge portions and support shaft insertion holes of the plurality of door panel side hinge portions, bearing members being disposed between at least two pairs of end surfaces adjacent to each other in the vertical direction out of the plurality of pairs of end surfaces in a state where both surfaces of each of the bearing members in an axial direction are in contact with each of the pairs of end surfaces, the bearing member being a cylindrical shape and made of a material excellent in wear resistance and slidability, and including a support shaft insertion hole into which the support shaft is inserted, and gaps in the vertical direction being ensured between the plurality of pairs of remaining end surfaces excluding the two pairs of end surfaces adjacent to each other in the vertical direction.

According to an embodiment of the present technology, the load of the door panel is received via the bearing member disposed below the door panel side hinge portion, of the two bearing members each disposed between the two pairs of end surfaces, by the structural frame side hinge portion disposed below the bearing member.

Further, the bearing member is in contact with the pair of end surfaces, and thus tilting of the door panel is prevented.

Furthermore, the gap is ensured between the pair of end surfaces other than the pair of end surfaces between which the bearing member is disposed, and thus interference between the structural frame side hinge end surface and the door panel side hinge end surface is prevented.

Consequently, the advantage of solving defects as in the related art such as a large gap between the hinge portions, rattling of the door panel, deterioration in design which are caused by wear of the hinge portions due to the empty weight of the door panel after long-term use is attained, and the advantage of securing a long-term smooth pivotal movement of the door panel is attained.

DETAILED DESCRIPTION

Hereinafter, embodiments of the present technology will be described.

Figure 1:
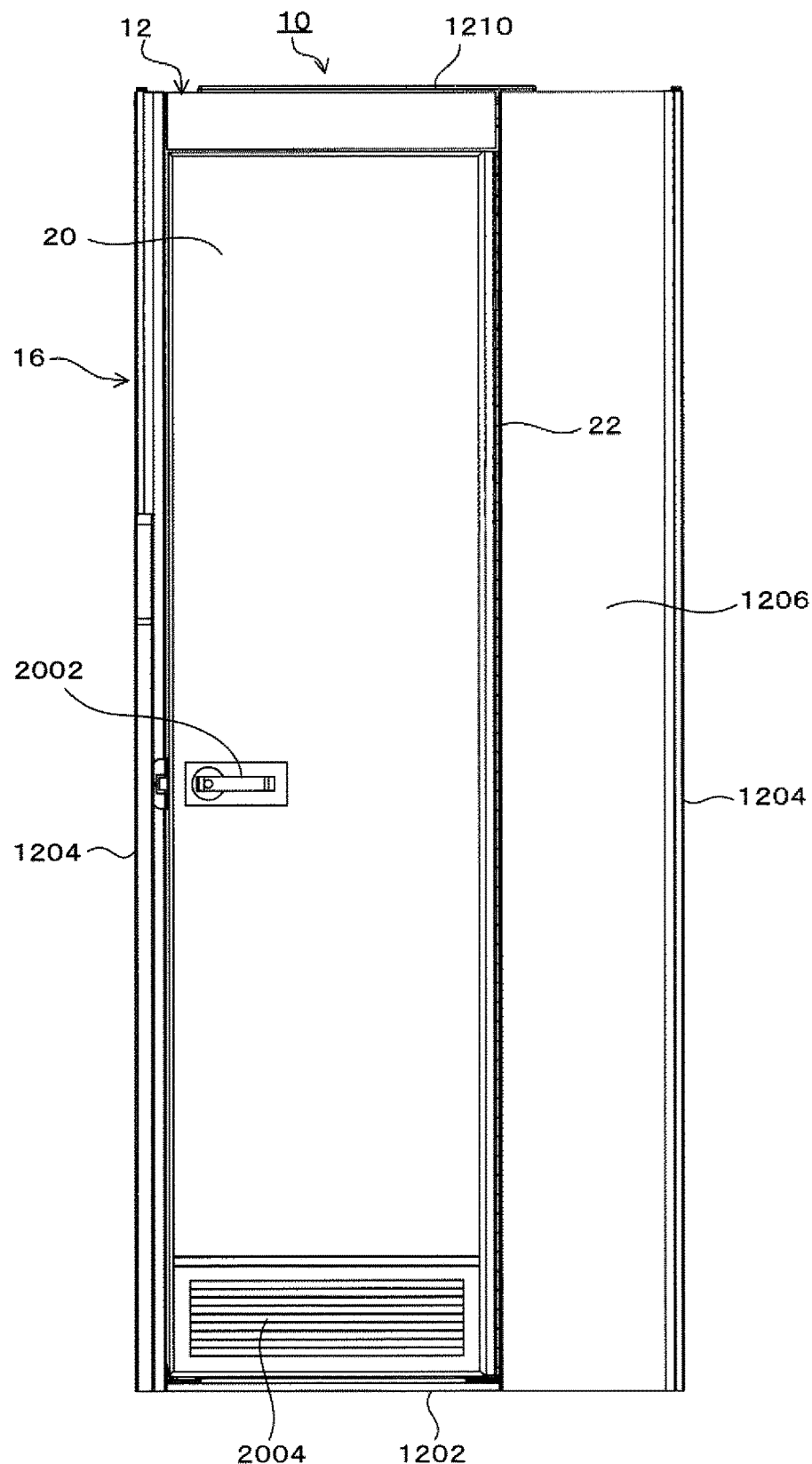
FIG. 1 is a front view of an aircraft lavatory unit.
Figure 2:
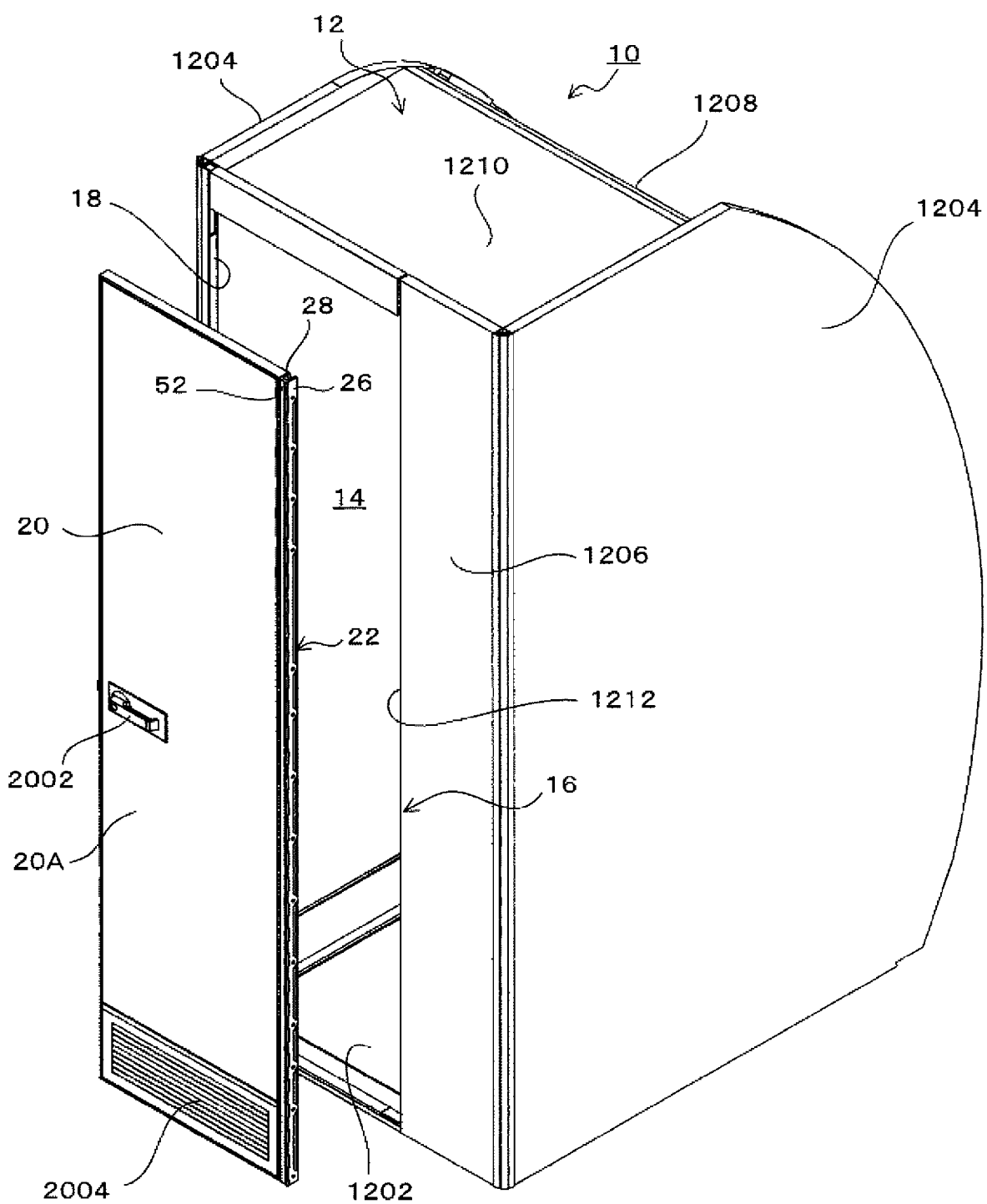
FIG. 2 is a perspective view of the aircraft lavatory unit from which a door panel is removed.

As illustrated in FIGS. 1 and 2, a structural frame 12 of an aircraft lavatory unit 10 includes a floor plate 1202, a pair of side walls 1204 standing up from the floor plate 1202 and facing in parallel with each other, a front wall 1206 and a rear wall 1208 which stand up from the floor plate 1202 and face each other, and a ceiling 1210.

A toilet bowl and a washstand are provided inside the structural frame 12, and the inside of the structural frame 12 serves as a lavatory 14.

An entrance 16 of the lavatory 14 is provided in the front wall 1206.

The entrances 16 includes an opening 18 formed in the front wall 1206, and a door panel 20 pivotally joined to a wall portion end surface 1212 forming an end portion of the front wall 1206 that rims the opening 18. A handle 2002 is provided on an outer surface 20A of the door panel 20, and a ventilating opening 2004 is provided in a lower portion of the door panel 20.

As illustrated in FIGS. 1 to 4B, the door panel 20 is pivotally attached to the wall portion end surface 1212 via a long hinge 22 and two bearing members 24.

Figure 3:
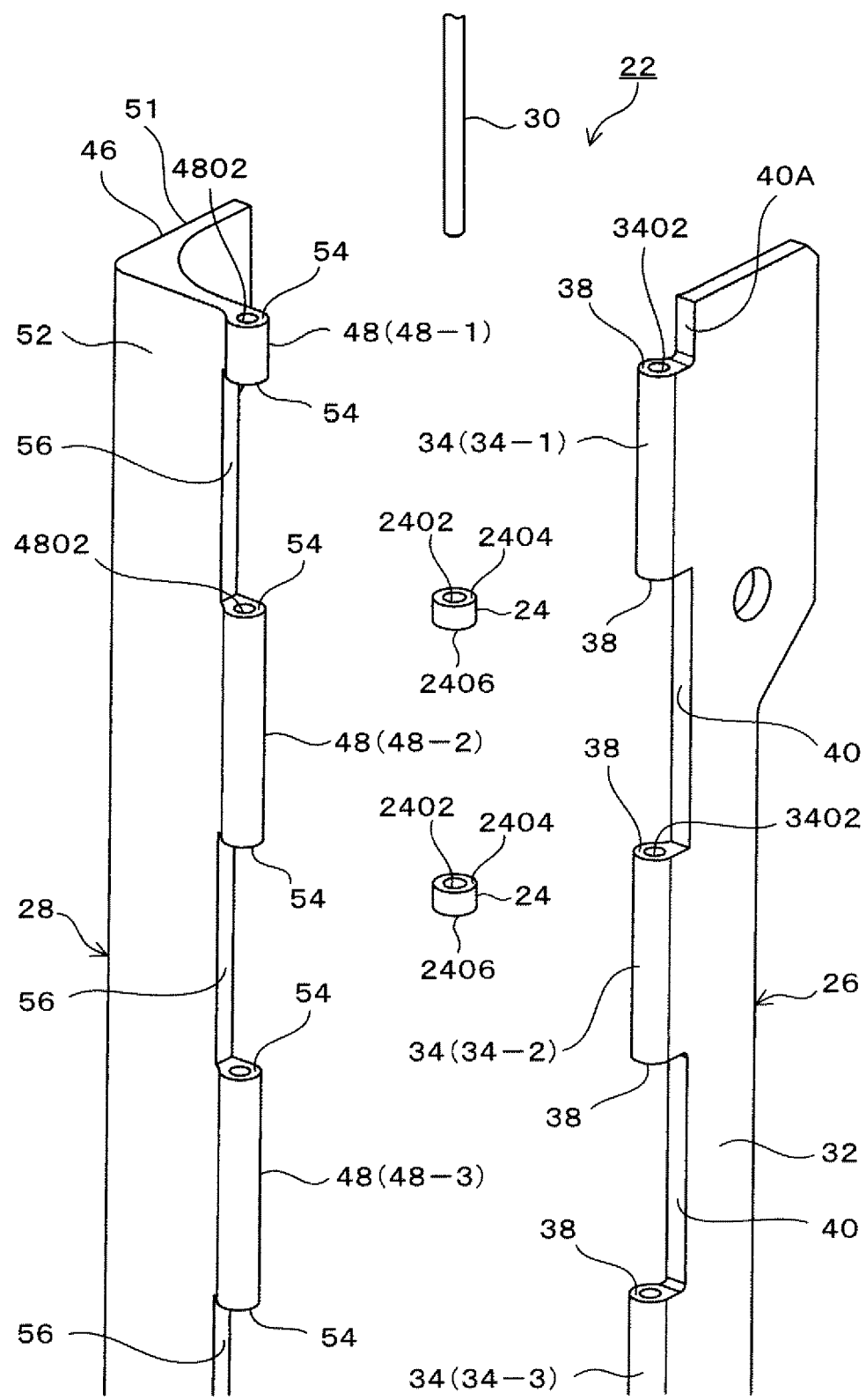
FIG. 3 is an exploded perspective view of a long hinge.

As illustrated in FIG. 3, the long hinge 22 includes a structural frame side hinge member 26, a door panel side hinge member 28, and a support shaft 30. In an embodiment of the present technology, the structural frame side hinge member 26 and the door panel side hinge member 28 are made of aluminum alloy, and the support shaft 30 is made of steel.

The structural frame side hinge member 26 includes a structural frame side attachment plate portion 32 and a plurality of structural frame side hinge portions 34.

Figure 4A:
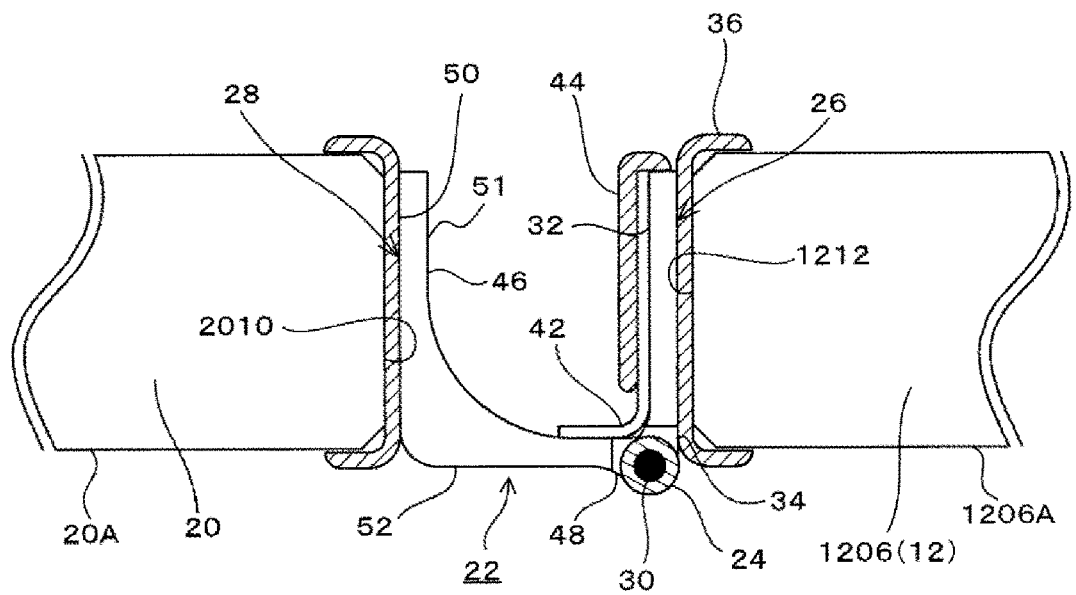
FIG. 4A is a plan view of a joining structure of a first door panel and a second door panel in a state where an entrance is closed.
Figure 4B:
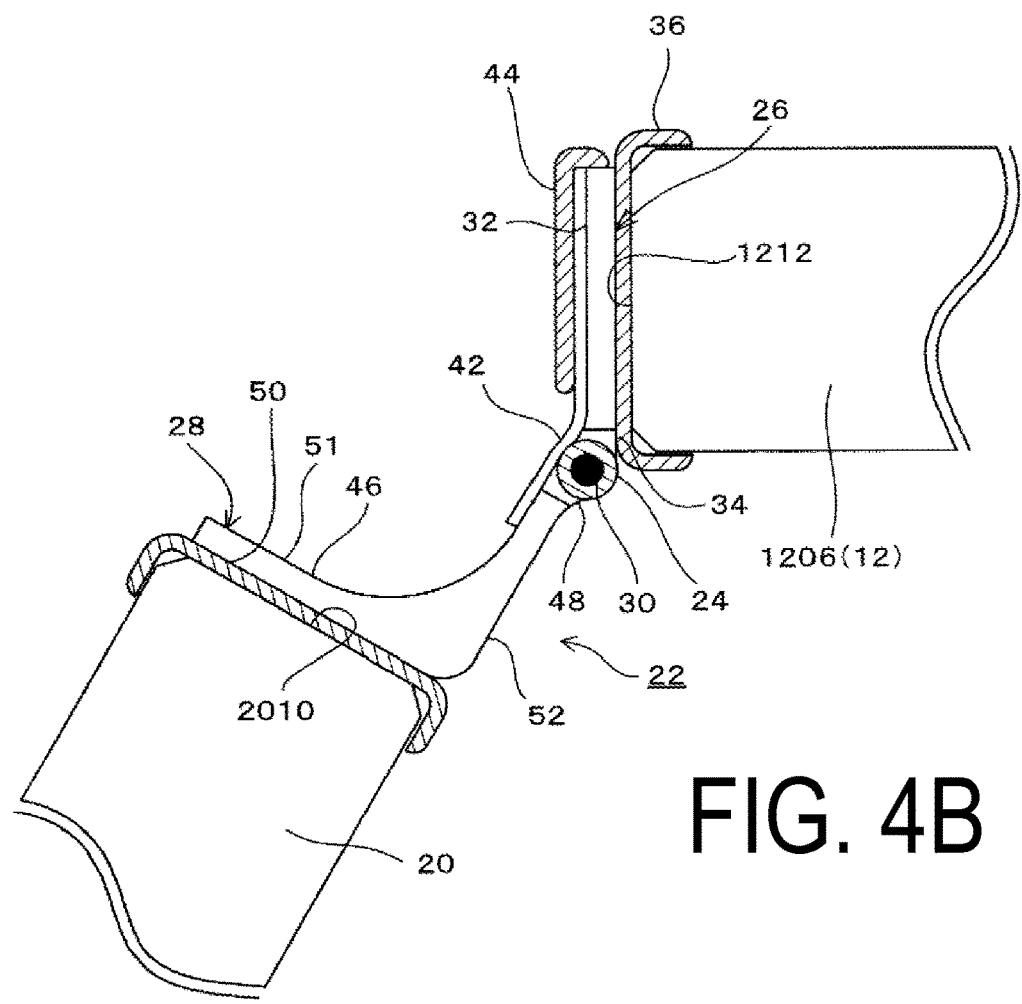
FIG. 4B is a plan view of the joining structure of the first door panel and the second door panel in a state where the entrance is opened.

As illustrated in FIGS. 4A and 4B, the structural frame side attachment plate portion 32 is a portion to be attached by a screw (not illustrated) to the wall portion end surface 1212 forming the end portion of the front wall 1206, and has an elongated shape having a length longer than a width and extends along an entire length in a longitudinal direction of the wall portion end surface 1212.

In the present embodiment, a first trim 36 for decoration is provided on the wall portion end surface 1212. The first trim 36 for decoration extends along the entire length in the longitudinal direction of the wall portion end surface 1212 and covers the wall portion end surface 1212, end portions on an inner surface of the front wall 1206, which are located on both sides of the wall portion end surface 1212 in the width direction, and an end portion of an outer surface 1206A, and thus the appearance of the aircraft lavatory unit 10 is enhanced.

The structural frame side attachment plate 32 is attached from above the trim 36 by a screw to the wall portion end surface 1212.

As illustrated in FIG. 3, the plurality of structural frame side hinge portions 34 are provided from one end in a width direction of the structural frame side attachment plate portion 32 approximately at equal intervals in a longitudinal direction of the structural frame side attachment plate portion 32 and protruding therefrom. As illustrated in FIGS. 4A and 4B, in a state where the structural frame side attachment plate portion 32 is attached to the wall portion end surface 1212, the plurality of structural frame side hinge portions 34 are located at sections of the wall portion end surface 1212, which are located adjacent to the outer surface 1206A located outside of the lavatory 14.

As illustrated in FIG. 3, both ends of each of the structural frame side hinge portions 34 in a length thereof along the longitudinal direction of the structural frame side attachment plate portion 32 are formed by flat structural frame side hinge portion end surfaces 38 orthogonal to the length direction.

The length of the structural frame side hinge portion 34 along the length direction of the structural frame side attachment plate portion 32 is formed of a substantially uniform length.

In addition, an interval between the adjacent structural frame side hinge portions 34 in the longitudinal direction of the structural frame side attachment plate portion 32, that is, between the structural frame side hinge portion end surfaces 38 facing each other, serves as a door panel side hinge portion insertion recess 40.

The structural frame side hinge portion 34 has a cylindrical shape, and a support shaft insertion hole 3402 is formed coaxially through each of the structural frame side hinge portions 34.

As illustrated in FIGS. 4A and 4B, the structural frame side hinge portions 34 are located toward the outside of the lavatory 14 in a state where the structural frame side attachment plate portion 32 is attached to the wall portion end surface 1212 of the structural frame 12 with the longitudinal direction facing in a vertical direction.

As illustrated in FIG. 3, an upper portion of a structural frame side hinge portion 34-1 located at the top is formed as a top door panel side hinge portion insertion recess 40A shorter in length than the other door panel side hinge portion insertion recesses 40.

Further, as illustrated in FIGS. 4A and 4B, a rubber plate 42 for preventing light leakage is attached via a fitting 44 to an opposite surface to a surface of the structural frame side attachment plate portion 32, which is attached to the wall portion end surface 1212 of the structural frame 12.

The rubber plate 42 has a width larger than that of the structural frame side attachment plate portion 32, has an elongated rectangular shape having a length approximately equal to that of the structural frame side attachment plate portion 32, and extends along the entire length in the longitudinal direction of the structural frame side attachment plate portion 32.

A major portion of the rubber plate 42 from which one side in the width direction is excluded is attached by the fitting 44 to the structural frame side attachment plate portion 32. One side of the rubber plate 42 in the width direction covers a joined sections between the structural frame side hinge portions 34 and the door panel side hinge portions 48, and a distal end portion at one side of the rubber plate 42 in the width direction is elastically in contact with an erected plate portion 52 of a door panel side attachment plate portion 46 described below.

Consequently, light leaking from the lavatory 14 at the joined sections between the structural frame side hinge portions 34 and the door panel side hinge portions 48 is prevented by the rubber plate 42 in an entire length in a longitudinal direction of the long hinge 22.

As illustrated in FIG. 3, the door panel side hinge member 28 includes the door panel side attachment plate portion 46 and the door panel side hinge portions 48.

As illustrated in FIG. 4A, a section of the door panel 20 to which the door panel side attachment plate portion 46 is attached is a door panel end surface 2010 that configures an end portion of the door panel 20. The wall portion end surface 1212 and the door panel end surface 2010 are disposed at an interval and parallel to each other and facing each other in a state where the entrance 16 is closed by the door panel 20.

As illustrated in FIGS. 4A and 4B, the door panel side attachment plate portion 46 is attached by a screw (not illustrated) to the door panel end surface 2010 of the door panel 20, and has an elongated shape having a length longer than a width.

In the present embodiment, the door panel side attachment plate portion 46 includes a base plate portion 51 to be attached to the door panel end surface 2010, and the erected plate portion 52 standing substantially at a right angle toward the wall portion end surface 1212 from an end portion of the base plate portion 51, which is located on the outer surface 20A of the door panel 20 located outside of the lavatory 14 in a state where the entrance 16 is closed by the door panel 20, the erected plate portion 52 having a distal end portion on which a plurality of door panel side hinge portions 48 are provided.

In the present embodiment, by providing such an erected plate portion 52, a storage space for the rubber plate 42 that prevents light leakage is ensured.

Both the base plate portion 51 and the erected plate portion 52 have an elongated shape having a length larger than a width, and extend along an entire length in a longitudinal direction of the door panel end surface 2010.

In the present embodiment, a second trim 50 for decoration is provided on the door panel end surface 2010 of the door panel 20. The second trim 50 for decoration extends along the entire length in the longitudinal direction of the door panel end surface 2010 and covers the door panel end surface 2010, end portions on an inner surface of the door panel 20, which are located on both sides of the door panel end surface 2010 in the width direction, and an end portion of the outer surface 20A, and thus the appearance of the aircraft lavatory unit 10 is enhanced.

The door panel side attachment plate portion 46, that is, the base plate portion 51 is attached from above the second trim 50 by a screw to the door panel end surface 2010 of the door panel 20.

As illustrated in FIG. 3, the plurality of door panel side hinge portions 48 are provided from one side in a width direction of the door panel side attachment plate portion 46 approximately at equal intervals in a longitudinal direction of the door panel side attachment plate portion 46 and protruding therefrom. Specifically, the plurality of door panel side hinge portions 48 are provided from one side in a width direction of the erected plate portion 52 approximately at equal intervals in a longitudinal direction of the erected plate portion 52 and protruding therefrom. Both ends of each of the door panel side hinge portions 48 in a length thereof along the longitudinal direction of the door panel side attachment plate portion 46 are formed by flat door panel side hinge portion end surfaces 54 orthogonal to the length direction.

In addition, an interval between the adjacent door panel side hinge portions 48 in the longitudinal direction of the door panel side attachment plate portion 46, that is, between the door panel side hinge portion end surfaces 54 facing each other, serves as a structural frame side hinge portion insertion recess 56.

The door panel side hinge portion 48 has a cylindrical shape, and a support shaft insertion hole 4802 is formed coaxially through each of the door panel side hinge portions 48.

The door panel side hinge portion 48 located at the top is formed as a top door panel side hinge portion 48-1 shorter in length than the other door panel side hinge portions 48.

Note that in order to enhance the appearance, the length of the remaining door panel side hinge portions 48 excluding the top door panel side hinge portion 48-1 is formed of a substantially uniform length that is approximately equal to the length of the structural frame side hinge portion 34.

In the present embodiment, the top door panel side hinge portion 48-1 of the door panel side hinge member 28 is inserted into the top door panel side hinge portion insertion recess 40A of the structural frame side hinge member 26.

Further, the plurality of structural frame side hinge portions 34 of the structural frame side hinge member 26 are inserted into the structural frame side hinge portion insertion recesses 56 of the door panel side hinge member 28, and the plurality of door panel side hinge portions 48 of the door panel side hinge member 28 are inserted into the door panel side hinge portion insertion recesses 40 of the structural frame side hinge member 26.

By alternately arranging the plurality of structural frame side hinge portions 34 and the plurality of door panel side hinge portions 48 in the vertical direction as just described, a plurality of pairs of end surfaces 38, 54 of the structural frame side hinge portion end surface 38 and the door panel side hinge portion end surface 54 facing each other in the vertical direction are provided at intervals in the vertical direction.

In addition, cylindrical bearing members 24 each including a support shaft insertion hole 2402 are disposed between two pairs of end surfaces 38, 54, which are located at least adjacent to each other in the vertical direction, of the plurality of end surfaces 38, 54.

The bearing member 24 is formed of, for example, a material such as polyether ether ketone resin (PEEK), polytetrafluoroethylene resin (PTFE), polyphenylene sulfide resin (PPS), polyacetal resin (POM), or the like, which is excellent in wear resistance and slidability.

Figure 5:
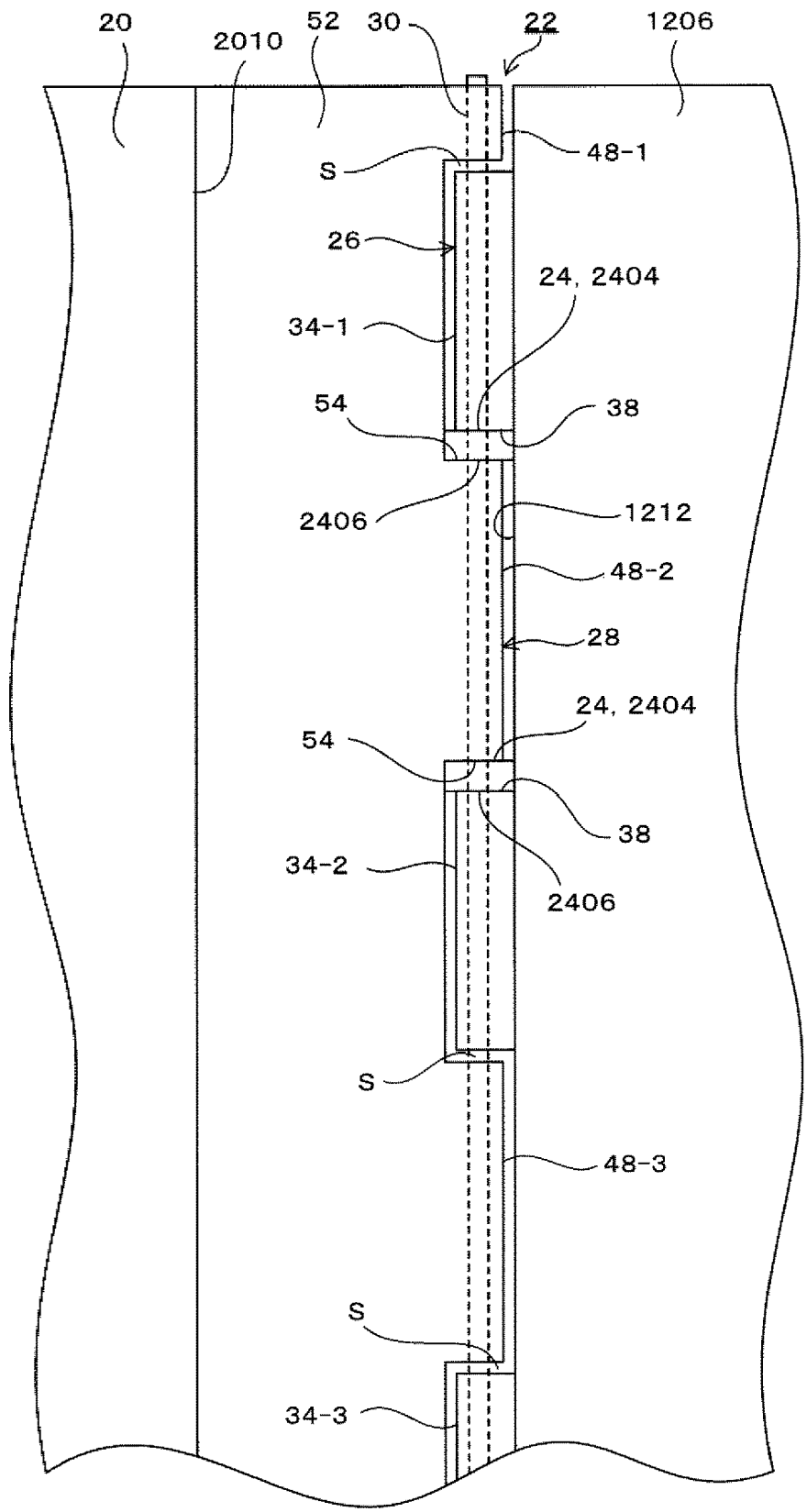
FIG. 5 is a front view of the joining structure of the first door panel and the second door panel when viewed from the outside of a lavatory in a state where the entrance is closed.

As illustrated in FIGS. 3 and 5, in the present embodiment, of the plurality of end surfaces 38, 54, the bearing members 24 are disposed between the second and third pairs from the top of end surfaces 38, 54.

The support shaft 30 is inserted through the support shaft insertion holes 3402 of the plurality of structural frame side hinge portions 34, the support shaft insertion holes 4802 of the plurality of door panel side hinge portions 48, and the support shaft insertion holes 2402 of the two bearing members 24, and thus the door panel 20 is pivotally attached to the wall portion end surface 1212 of the structural frame 12.

Note that the door panel 20 may be attached to the structural frame 12 as illustrated in FIGS. 2, 4A and 4B, and the door panel side hinge member 28 is attached to the door panel end surface 2010 of the door panel 20, and then the structural frame side hinge member 26 is pivotally joined to the door panel side hinge member 28 with the use of the bearing members 24 and the support shaft 30. Finally, the structural frame side attachment plate portion 32 is attached to the wall portion end surface 1212 of the structural frame 12. Alternatively, the door panel side hinge member 28 is attached to the door panel end surface 2010 of the door panel 20, and then the structural frame side attachment plate portion 32 is attached to the wall portion end surface 1212 of the structural frame 12. Finally, the door panel side hinge member 28 and the structural frame side hinge member 26 may be pivotally joined with the use of the bearing members 24 and the support shaft 30. Various methods for attaching the door panel 20 to the structural frame 12 are conceived, and any of the methods is applicable.

In addition, various known structures for preventing detachment or falling-off are provided at the support shaft 30, for example, a large diameter portion or a stop ring for preventing detachment or falling-off is provided at an upper portion of the support shaft 30.

As illustrated in FIGS. 3 and 5, the two bearing members 24 are disposed such that both surfaces 2404, 2406 of each of the bearing members 24 in an axial direction are in contact with the pair of end surfaces 38, 54.

In other words, in the present embodiment, a door panel side hinge portion 48-2 second from the top is inserted into the door panel side hinge portion insertion recess 40 between a structural frame side hinge portion 34-1 first from the top and a structural frame side hinge portion 34-2 second from the top.

Consequently, the lower surface 2406 of the bearing member 24 disposed on the upper door panel side hinge portion end surface 54 of the second door panel side hinge portion 48-2 is in contact with the upper door panel side hinge portion end surface 54 of the door panel side hinge portion 48-2, and the upper surface 2404 of the bearing member 24 is in contact with the structural frame side hinge portion end surface 38 of the first structural frame side hinge portion 34-1 from the top.

Further, the lower surface 2406 of the bearing member 24 disposed on the lower door panel side hinge portion end surface 54 of the second door panel side hinge portion 48-2 from the top is in contact with the upper structural frame side hinge portion end surface 38 of the second structural frame side hinge portion 34-2 from the top, and the upper surface 2404 of the bearing member 24 is in contact with the lower door panel side hinge portion end surface 54 of the second door panel side hinge portion 48-2 from the top.

In other words, the door panel side hinge portion 48-2 sandwiched by the bearing members 24 is configured such that the upper and lower door panel side hinge portion end surfaces 54 are via the bearing members 24 in contact with the upper and lower structural frame side hinge portion end surfaces 38, and tilting to the support shaft 30 is suppressed within a minimum range, that is, tilting of the door panel 20 is suppressed within a minimum range.

Furthermore, gaps S in the vertical direction are each secured between the plurality of pairs of remaining end surfaces 38, 54 excluding the two pairs of end surfaces 38, 54.

When the door panel 20 is tilted within a minimum range, a plurality of gaps S are each formed in dimensions such that the door panel side hinge portion end surface 54 and the structural frame side hinge portion end surface 38 facing each other via the gap S are not brought into contact with each other, and the gap S is adequately, for example, from 0.2 to 0.3 mm.

Note that in this case, when the plurality of gaps S have substantially equal dimensions, the dimensions in the vertical direction of the gaps S are equal dimensions, which is advantageous in improving the appearance of the aircraft lavatory unit 10.

According to the present embodiment, the load of the door panel 20 is received by the structural frame side hinge portion 34-2 via the bearing member 24, disposed below the door panel side hinge portion 48-2, of the two bearing members 24 each disposed between the two pairs of end surfaces 38, 54.

In addition, the upper and lower door panel side hinge portion end surfaces 54 of the door panel side hinge portion 48-2 sandwiched by the bearing members 24 are in contact via the bearing members 24 with the upper and lower structural frame side hinge portion end surfaces 38 of the structural frame side hinge portion 34-1 and the structural frame side hinge portion 34-2, and thus tilting of the door panel 20 is prevented.

Further, the gap S is secured between the pair of end surfaces 38, 54 other than the pair of end surfaces 38, 54 between which the bearing member 24 is disposed, and thus interference between the structural frame side hinge portion end surface 38 and the door panel side hinge portion end surface 54 is prevented.

Consequently, the advantage of solving defects as in the related art such as a large gap between the hinge portions, rattling of the door panel 20, deterioration in design which are caused by wear of the hinge portions due to the empty weight of the door panel 20 after long-term use is attained, and the advantage of securing a long-term smooth pivotal movement of the door panel 20 is attained.

In addition, the number of bearing members 24 may be selectively set; however, a minimum number of bearing members 24 is adequately two bearing members, which is advantageous in suppressing increase in costs.

Note that when the bearing member 24 wears off due to the long-term use, the two bearing members 24 are replaced, and thus maintenance operation can be easily performed and the long-term smooth pivotal movement of the door panel 20 can be ensured again.

Further, although the gap S is secured between the pair of end surfaces 38, 54 other than the pair of end surfaces 38, 54 between which the bearing member 24 is disposed, the rubber plate 42 covering from the inner side of the lavatory 14 the joined sections between the structural frame side hinge portions 34 and the door panel side hinge portions 48 is provided. Consequently, light leaking from the lavatory 14 at the joined sections between the structural frame side hinge portions 34 and the door panel side hinge portions 48 is prevented, which is advantageous in increasing the appearance of the aircraft lavatory unit 10.

Note that the rubber plate 42 may be attached to the door panel side attachment plate portion 46 such that one side thereof is elastically in contact with the structural frame side attachment plate portion 32, and likewise, the effect similar to the effect described above can be obtained.

Further, the location where the bearing member 24 is disposed may be between two pairs of end surfaces 38, 54 adjacent in the vertical direction. Of a plurality of pairs of end surfaces 38, 54 arranged in the vertical direction, the positions in the vertical direction of the two pairs of end surfaces 38, 54 between which the bearing member 24 is disposed are not limited. However, when, of the plurality of pairs of end surfaces 38, 54, a pair of end surfaces 38, 54 is located near or at the top and another pair of end surfaces 38, 54 is located directly below the former pair of end surfaces 38, 54, or when a pair of end surfaces 38, 54 is located near or at the bottom and another pair of end surfaces 38, 54 is located directly above the former pair of end surfaces 38, 54, the bearing members 24 are not easily seen from a user of the aircraft lavatory unit 10, which is advantageous in increasing the appearance of the aircraft lavatory unit 10.

Furthermore, in the present embodiment, a case in which the bearing members 24 are disposed above and below the door panel side hinge portion 48-2; meanwhile, even when the bearing members 24 are disposed above and below the structural frame side hinge portion 34, the similar effect is attained.

In this case, the load of the door panel 20 is received by the structural frame side hinge portion 34 from the door panel side hinge member 28 disposed on the structural frame side hinge portion 34 via the bearing member 24, and the door panel side hinge portion end surfaces 54 of the door panel side hinge portions 48 disposed above and below the structural frame side hinge portion 34 are each brought into contact via the bearing members 24 with the structural frame side hinge portion end surfaces 38 of the structural frame side hinge portion 34. Thus, tilting of the door panel 20 is prevented.

The invention claimed is:

1. A joining structure for a door panel of a lavatory for an aircraft lavatory unit, the joining structure comprising a long hinge that comprises a structural frame side hinge member and a door panel side hinge member, the structural frame side hinge member being attached to a section configuring an entrance of a structural frame forming the lavatory of the aircraft lavatory unit, and the door panel side hinge member being attached to the door panel configured to open and close the entrance, the structural frame side hinge member comprising a structural frame side attachment plate portion and a plurality of structural frame side hinge portions, the structural frame side attachment plate portion being attached to the section that configures the entrance of the structural frame, and the plurality of structural frame side hinge portions being disposed projecting at intervals in the vertical direction on the structural frame side attachment plate portion, the door panel side hinge member comprising a door panel side attachment plate portion and a plurality of door panel side hinge portions, the door panel side attachment plate portion being attached to the door panel, and the plurality of door panel side hinge portions being disposed projecting at intervals in the vertical direction on the door panel side attachment plate portion, and being alternately arranged with the plurality of structural frame side hinge portions in the vertical direction, the plurality of structural frame side hinge portions and the plurality of door panel side hinge portions being alternately arranged in the vertical direction and providing a plurality of pairs of an end surface of the structural frame side hinge portion and an end surface of the door panel side hinge portion, the door panel being pivotally joined to the structural frame by a support shaft being inserted into support shaft insertion holes of the plurality of structural frame side hinge portions and support shaft insertion holes of the plurality of door panel side hinge portions, bearing members being disposed between at least two pairs of end surfaces adjacent to each other in the vertical direction out of the plurality of pairs of end surfaces in a state where both surfaces of each of the bearing members in an axial direction are in contact with each of the pairs of end surfaces, the bearing member being a cylindrical shape and comprising a support shaft insertion hole into which the support shaft is inserted, the bearing members being disposed closer to one end of the joining structure than to a vertical center of the joining structure, and gaps in the vertical direction being ensured between the plurality of pairs of remaining end surfaces excluding the at least two pairs of end surfaces adjacent to each other in the vertical direction.

2. The joining structure for a door panel of a lavatory for an aircraft lavatory unit according to claim 1, wherein the two pairs of end surfaces adjacent to each other in the vertical direction into which the bearing members are disposed are a pair of end surfaces located near or at a top of the plurality of pairs of end surfaces or a pair of end surfaces located near or at a bottom of the plurality of pairs of end surfaces.

3. The joining structure for a door panel of a lavatory for an aircraft lavatory unit according to claim 2, wherein dimensions in the vertical direction of the gaps between the plurality of pairs of remaining end surfaces excluding the two pairs of end surfaces are formed in substantially equal dimensions.

4. The joining structure for a door panel of a lavatory for an aircraft lavatory unit according to claim 3, wherein a rubber plate having elasticity is disposed and attached to the structural frame side attachment plate portion or the door panel side attachment plate portion, the rubber plate being configured to cover from an inner side of the lavatory joined sections between the plurality of structural frame side hinge portions and the plurality of door panel side hinge portions which are alternately arranged in the vertical direction in a state where the bearing members are interposed between the two pairs of end surfaces and the plurality of structural frame side hinge portions and the plurality of door panel side hinge portions are pivotally joined together by the support shaft.

5. The joining structure for a door panel of a lavatory for an aircraft lavatory unit according to claim 4, wherein a section of the structural frame to which the structural frame side attachment plate portion is attached is a wall portion end surface serving as an end portion of a wall portion constituting the structural frame, a section of the door panel to which the door panel side attachment plate portion is attached is a door panel end surface constituting an end portion of the door panel, the wall portion end surface and the door panel end surface are disposed at an interval, being parallel to each other and facing each other in a state where the entrance is closed by the door panel, with the structural frame side attachment plate portion being attached to the wall portion end surface, the plurality of structural frame side hinge portions are located at sections of the wall portion end surface, which are located adjacent to an outer surface located outside of the lavatory, and the door panel side attachment plate portion comprises a base plate portion attached to the door panel end surface, and an erected plate portion standing toward the wall portion end surface from an end portion of the base plate portion, which is located on an outer surface of the door panel located outside of the lavatory in a state where the entrance is closed by the door panel, the erected plate portion having a distal end portion on which the plurality of door panel side hinge portions are provided.

6. The joining structure for a door panel of a lavatory for an aircraft lavatory unit according to claim 5, comprising a first trim configured to cover the wall portion end surface and a second trim configured to cover the door panel end surface, wherein the structural frame side attachment plate portion is attached via the first trim to the wall portion end surface, and the base plate portion is attached via the second trim to the door panel end surface.

7. The joining structure for a door panel of a lavatory for an aircraft lavatory unit according to claim 1, wherein dimensions in the vertical direction of the gaps between the plurality of pairs of remaining end surfaces excluding the two pairs of end surfaces are formed in substantially equal dimensions.

8. The joining structure for a door panel of a lavatory for an aircraft lavatory unit according to claim 1, wherein a rubber plate having elasticity is disposed and attached to the structural frame side attachment plate portion or the door panel side attachment plate portion, the rubber plate being configured to cover from an inner side of the lavatory joined sections between the plurality of structural frame side hinge portions and the plurality of door panel side hinge portions which are alternately arranged in the vertical direction in a state where the bearing members are interposed between the two pairs of end surfaces and the plurality of structural frame side hinge portions and the plurality of door panel side hinge portions are pivotally joined together by the support shaft.

9. The joining structure for a door panel of a lavatory for an aircraft lavatory unit according to claim 1, wherein a section of the structural frame to which the structural frame side attachment plate portion is attached is a wall portion end surface serving as an end portion of a wall portion constituting the structural frame, a section of the door panel to which the door panel side attachment plate portion is attached is a door panel end surface constituting an end portion of the door panel, the wall portion end surface and the door panel end surface are disposed at an interval, being parallel to each other and facing each other in a state where the entrance is closed by the door panel, with the structural frame side attachment plate portion being attached to the wall portion end surface, the plurality of structural frame side hinge portions are located at sections of the wall portion end surface, which are located adjacent to an outer surface located outside of the lavatory, and the door panel side attachment plate portion comprises a base plate portion attached to the door panel end surface, and an erected plate portion standing toward the wall portion end surface from an end portion of the base plate portion, which is located on an outer surface of the door panel located outside of the lavatory in a state where the entrance is closed by the door panel, the erected plate portion having a distal end portion on which the plurality of door panel side hinge portions are provided.

10. The joining structure for a door panel of a lavatory for an aircraft lavatory unit according to claim 5, comprising a first trim configured to cover the wall portion end surface and a second trim configured to cover the door panel end surface, wherein the structural frame side attachment plate portion is attached via the first trim to the wall portion end surface, and the base plate portion is attached via the second trim to the door panel end surface.

* * * * *